US008636516B2

(12) United States Patent
Batsikouras

(10) Patent No.: US 8,636,516 B2
(45) Date of Patent: Jan. 28, 2014

(54) APPARATUS AND SYSTEM FOR WEIGHING FOOD ITEMS

(76) Inventor: Nicolaos Batsikouras, Romeo, MI (US)

(*) Notice: Subject to any disclaimer, the term of this patent is extended or adjusted under 35 U.S.C. 154(b) by 136 days.

(21) Appl. No.: 13/426,180

(22) Filed: Mar. 21, 2012

(65) Prior Publication Data
US 2013/0025944 A1 Jan. 31, 2013

Related U.S. Application Data

(60) Provisional application No. 61/512,753, filed on Jul. 28, 2011.

(51) Int. Cl.
G09B 19/00 (2006.01)

(52) U.S. Cl.
USPC .................................. 434/127; 177/25.13

(58) Field of Classification Search
USPC .................................. 434/127; 177/25.13
See application file for complete search history.

(56) References Cited

U.S. PATENT DOCUMENTS

| | | | |
|---|---|---|---|
| 3,678,248 A | 7/1972 | Tricault | |
| 4,966,295 A | 10/1990 | Parrish | |
| 5,454,721 A | 10/1995 | Kuch | |
| 5,560,653 A | 10/1996 | Beppu | |
| 6,296,488 B1 | 10/2001 | Brenkus | |
| 6,978,221 B1 * | 12/2005 | Rudy | 702/173 |
| D515,866 S | 2/2006 | Wiedmeyer | |
| 7,541,548 B1 | 6/2009 | Sze | |
| 8,330,057 B2 * | 12/2012 | Sharawi et al. | 177/25.16 |
| 2001/0048955 A1 | 12/2001 | Foreman | |
| 2006/0036395 A1 | 2/2006 | Shaya | |
| 2007/0289973 A1 | 12/2007 | Acosta | |
| 2010/0038149 A1* | 2/2010 | Corel | 177/25.16 |

* cited by examiner

Primary Examiner — Xuan Thai
Assistant Examiner — Banafsheh Hadizonooz
(74) Attorney, Agent, or Firm — Ariel S. Bentolila; Bay Area IP Group, LLC

(57) ABSTRACT

An apparatus and a system comprise a plate device comprising a support structure and a plurality of compartments being configured to retain items. The compartments are supported by the support structure. A plurality of weighing devices is configured to weigh the compartments. A scale support structure is configured to support the plate device and the weighing devices. A processing device is in communication with the weighing devices and is operable to at least process weight information. A presentation device is in communication with the processing device. The presentation device is operable to at least display processed weight information of items in each of the compartments and to display a sum total of processed weight information of items retained in the plate device.

18 Claims, 7 Drawing Sheets

APPARATUS AND SYSTEM FOR WEIGHING FOOD ITEMS

CROSS-REFERENCE TO RELATED APPLICATIONS

The present Utility patent application claims priority benefit of the U.S. provisional application for patent Ser. No. 61/512,753 entitled "SMART DIET PLATE", filed on 28 Jul. 2011, under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to systems for measurement of weight. More particularly, one or more embodiments of the invention relate to scale systems associated with dieting.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Dieting is the practice of eating food in a regulated fashion to achieve or maintain a controlled weight. Examples of diets for promoting weight loss include low-fat, low-carbohydrate and low-calorie. Dieting is often combined with exercise in order to achieve or maintain a controlled weight. Person's participating in dieting programs often use a weight scale, pencil, paper and/or calculator for tracking progress associated with dieting. The caloric and nutritional information associated with foods for dieting may be retrieved from a book or other reference source.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
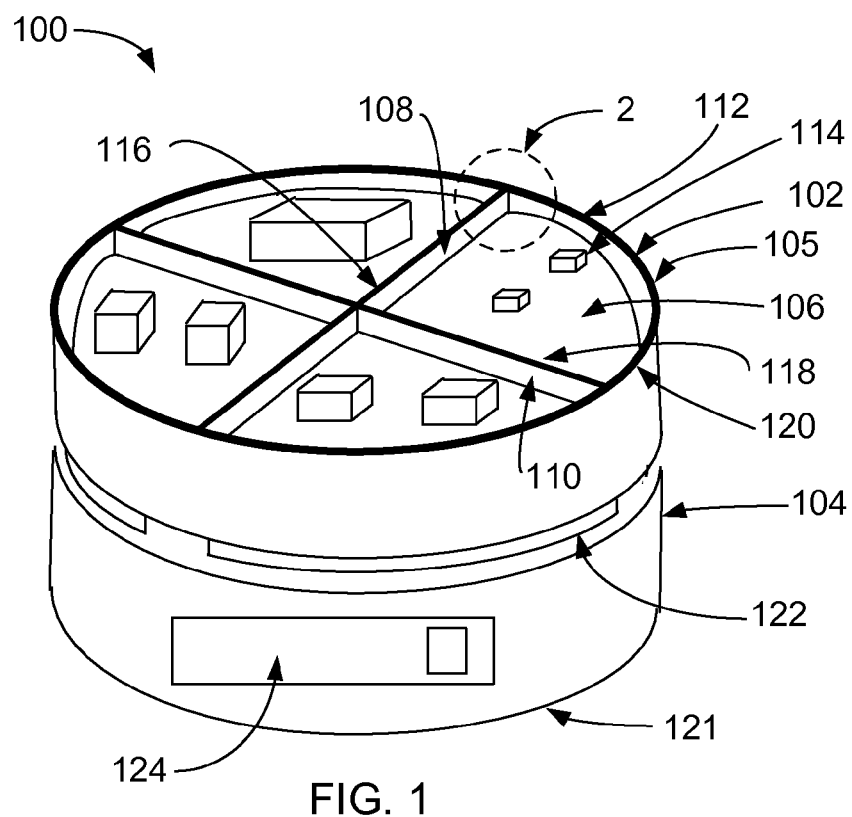
FIG. 1 illustrates an example scale system, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

Embodiments of the present invention will be described which provide means and methods for a scale system. Scale system provides capability for weighing items located within each compartment of a plate device. Items located associated with compartments may be individually weighed in a simultaneous manner. Plate device may be configured for movable compartments, stationary compartments or compartments with built-in weight scales. Plate device may be rigid, semi-rigid or flexible. Scale system provides capability for performing calculations and presenting information associated with the items contained within the plate compartments. Scale system provides capability for presenting weights of items associated with each compartment individually and for presenting the sum total of all the items in all of the compartments. Scale system provides capability for presenting nutritional information such as, but not limited to, calories, protein amounts, salt, etc. of items associated with each compartment individually and for presenting the sum total of nutritional information for all the items in all of the compartments. Scale system provides capability for storing the results of weighing and nutritional information results for each plate device of a user. Scale system provides capability for presenting a running total of the stored results. Scale system provides capability for enabling multiple users to use the system and maintain results for each user separately. Scale system provides capability for communicating results and stored information to external computing devices. Scale system provides capability for receiving and communicating audio information for control, configuration and operation. Scale system provides capability for tracking and monitoring food and calorie information, restaurant calorie intake per serving. Scale system provides graphical information to enable motivation associated with a user's goals.

FIG. 1 illustrates an example scale system, in accordance with an embodiment of the present invention.

A scale system 100 includes a plate portion 102 and a scale portion 104.

Scale system 100 enables individual weighing via scale portion 104 of a multiplicity of items contained within plate portion 102.

Plate portion 102 provides a multiplicity of compartments for containing items. Non-limiting examples for items include foods and liquids. As non-limiting examples, plate portion 102 may be configured with movable compartments or stationary compartments. Non-limiting examples for configuration of plate portion 102 include rigid, semi-rigid and flexible.

For embodiments with stationary compartments associated with plate portion 102, the weights of items contained within the compartments may be determined using any known method for calculating and/or estimating distributed weights.

Scale portion 104 provides individual weighing for a multiplicity of items contained within plate portion 102 and with plate portion 102 located on scale portion 104.

Plate portion 102 includes a plate support structure 105 and a multiplicity of compartments for containing items with a sampling noted as a compartment portion 106.

Plate support structure 105 provides support and retention for compartment portion 106.

Compartment portion 106 provides containment of an item or items. Non-limiting examples of items include foods and liquids.

Compartment portion 106 includes a rectangular wall 108, a rectangular wall 110 and a circular wall 112.

Rectangular wall 108, rectangular wall 110 and circular wall 112 provide containment of an item 114 residing within compartment portion 106. Non-limiting examples for item 114 include food and liquid.

Rectangular wall 108 includes a lip 116. Rectangular wall 110 includes a lip 118. Circular wall 112 includes a lip 120.

Lip 116, lip 118 and lip 120 retain compartment portion 106 within plate support structure 105. Furthermore, compartment portion 106 may move up/down with respect to plate support structure 105. Lip 116, lip 118 and lip 120 reside on plate support structure 105 with no force applied to the bottom of compartment portion 106. With application of force, compartment portion 106 is pushed up through plate support structure 105 with lip 116, lip 118 and lip 120 not residing on plate support structure 105.

Scale portion 104 includes a scale support structure 121, a multiplicity of pedestal portions with a sampling noted as a pedestal portion 122 and a presentation portion 124. Scale portion 104 may be configured for processing plate portion 102 configured with movable compartments or stationary compartments. In some practical embodiments, each compartment is completely independent from any other compartment, and has its own corresponding scale, hardware, and electronics to enable its independent functionality.

Scale support structure 121 provides for weighing a multiplicity of items.

Pedestal portion 122 provides placement of an item for weighing.

Presentation portion 124 provides capability for presenting information for viewing by a user.

Plate portion 102 may be configured for washing and immersion in water. Furthermore, plate portion 102 may be configured for microwave operation.

Scale system 100 provides capability for processing information associated with calorie, nutrition and points systems for third party weight management programs. Furthermore, scale system 100 provides capability for processing information associated with food for restaurants and fast eating establishments. As an example, information associated with a food item placed within compartment portion 106 may be communicated to user via presentation portion 124. Furthermore, scale system 100 receives information associated with food contained with the compartment and based upon the weight of the item presents calorie, nutrition and points information to user for viewing.

Scale system 100 provides capability for processing information associated with weight management goals. As a non-limiting example, a person seeking to lose two pounds per week may provide information such as age, weight, activity level, gender and scale system 100 provides a daily plan for meeting the goal by processing and presenting a calorie or point budget. Furthermore, scale system 100 provides capability to receive, process and track information associated with food and liquid intake on a daily, weekly, monthly and/or yearly basis. Furthermore, scale system 100 provides graphical information associated with meeting or exceeding daily plan and goals. As a non-limiting example, scale system 100 may inform a user of exceeding food/liquid intake goal or plan. As another non-limiting example, scale system 100 may reduce food/liquid intake plan/goal for a day where food/liquid intake is exceeded. Scale system 100 receives, processes and tracks food/liquid intake on a daily, weekly, monthly, yearly basis for providing information associated with meeting plan/goal. Scale system 100 receives, processes and presents information associated with exercise programs and special diet programs. Non-limiting examples of special diet programs include diabetic, high blood pressure, body builders and other associated medical related diets.

Scale system 100 may receive information from a user. Non-limiting examples of means for receiving information include audio and keyboard. Audio information may be received and processed for any known language.

Scale system 100 provides capability to support a multiplicity of users where scale system 100 process information based upon user identification.

Scale system 100 may be configured for a multiplicity of geometric shapes. As a non-limiting example, scale system 100 may be configured in a circular shape.

Scale system 100 may receive, process and present information in a multiplicity of dimensions. As a non-limiting example, scale system 100 may receive, process and present information in units of milligrams and pounds. Furthermore, as a non-limiting example, scale system 100 may process and present information in metric and any other known measurement system. Scale system 100 may receive, process and present information in a multiplicity of languages. Non-limiting examples of languages supported include English, Spanish and French.

Components associated with scale portion 104 may be enclosed in a single enclosure or a multiplicity of enclosures. Non-limiting examples for components include processors, weight sensors, communications electronics and graphical presentation devices.

Scale system 100 provides capability for communication with computing devices. Non-limiting examples for computing devices include notebook computer, smartphone and other handheld computer and mobile communication devices. As a non-limiting example, scale system 100 may communicate with computing devices via wireless, wired and/or infrared. As a non-limiting example, communication may be provided via Universal Serial Bus (USB). Furthermore, scale system 100 may provide charging of batteries associated with connected computing devices.

Scale system 100 may provide educational information associated with weight management and portion sizing.

In some embodiments, plate portion 102 provides movable compartments where items (e.g. food) may be placed. As a non-limiting example, the number of compartments may be configured for four. Furthermore, the weight and associated calorie count/points of the items located with the compartments may be individually determined per compartment. Information associated with the weight of the items located within the compartments may be presented individually and/or as a cumulative weight. Compartments may be noted for identification. For example, a compartment may be configured as "compartment #1". Compartment identification information may be communicated from plate portion 102 to scale portion 104. Non-limiting examples for communication between plate portion 102 and scale portion 104 include barcode, LED and RF Identification (RFID). Information associated with the contents of the compartments may be communicated via presentation portion 124. As a non-limiting example, the contents of compartment portion 106 may be communicated as pork chops. Non-limiting examples for items contained within compartment portion 106 or other compartments include green beans, apple sauce and baked potatoes. Received information associated with type of item located within a compartment and information associated with the weight of the compartment is processed for determining the weight of the item(s) located within a compartment. Furthermore, calorie or point information associated with the item(s) located within a compartment is determine and communicated via presentation portion 124.

In operation, plate portion 102, containing items (e.g. item 114), is located on top of scale portion 104 with compartment portion 106 making contact with and residing on top of pedestal portion 122. A force is applied to compartment portion 106 via pedestal portion 122 which results in compartment portion 106 being pushed up with respect to plate support structure 105. The weight of compartment portion 106 plus the weight of items located within compartment portion 106 is recorded by scale portion 104. The weight for compartment portion 106 plus the weight of items located within compartment portion 106 is recorded by scale portion 104. Scale portion 104 subtracts the weight of compartment portion 106 from the weight recorded by scale portion 104 in order to determine the weight of the items located within compartment portion 106. Furthermore, the weight calculated for items located within compartment portion 106 is presented for viewing via presentation portion 124.

FIG. 1 illustrates an example scale system where compartments for a plate may be individually weighed, processed and presented for viewing.

Figure 2:
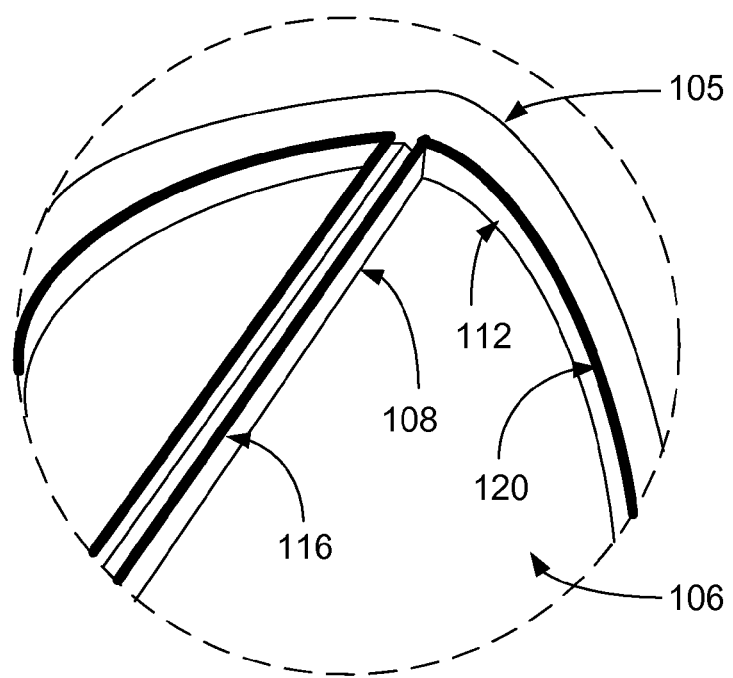
FIG. 2 illustrates a cut-out view of the example scale system as described with reference to FIG. 1, in accordance with an embodiment of the present invention.

FIG. 2 illustrates a cut-out view of the example scale system as described with reference to FIG. 1, in accordance with an embodiment of the present invention.

Lip 116 and lip 120 reside on top of plate support structure 105 preventing compartment portion 106 from slipping through plate support structure 105. A force applied to the bottom of compartment portion 106 pushes compartment portion 106 up with respect to plate support structure 105.

FIG. 2 illustrates a cut-out view of the example scale system as described with reference to FIG. 1 where lips on a compartment prevent the compartment from slipping through a support structure.

Figure 3A:
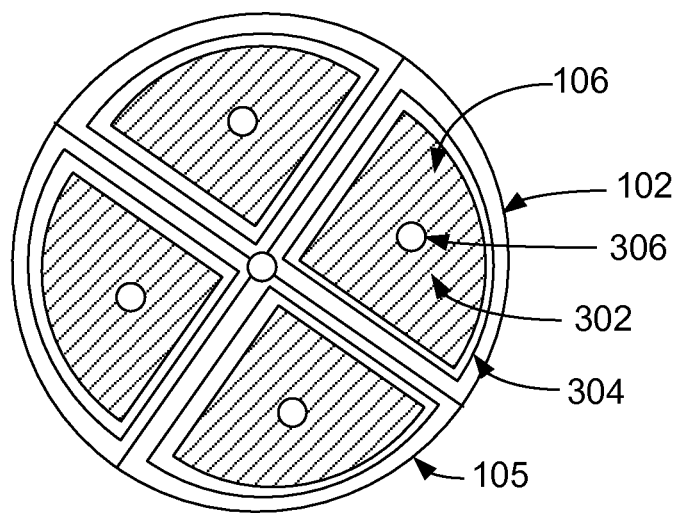
FIG. 3A illustrates a bottom view of the example plate as described with reference to FIG. 1, in accordance with an embodiment of the present invention.

FIG. 3A illustrates a bottom view of the example plate as described with reference to FIG. 1, in accordance with an embodiment of the present invention.

A bottom 302 is located on the bottom portion of compartment portion 106 contained within plate support structure 105.

Compartment portion 106 traverses through a cut-out 304 of plate support structure 105.

Plate portion 102 includes a multiplicity of identifier tags with a sampling noted as an identifier tag 306. Non-limiting examples for configuring identifier tag 306 include barcode, QR code, magnet and RFID. Identifier tags enable detection and identification of compartments and support structure associated with plate portion 102. Identifier tag 306 is attached to or embedded in compartment portion 106. Identifier tag 306 provides identification for the type of compartment associated with plate portion 102.

FIG. 3A illustrates a bottom view of the example plate as described with reference to FIG. 1 where a compartment portion traverses a cut-out of the support structure.

Figure 3B:
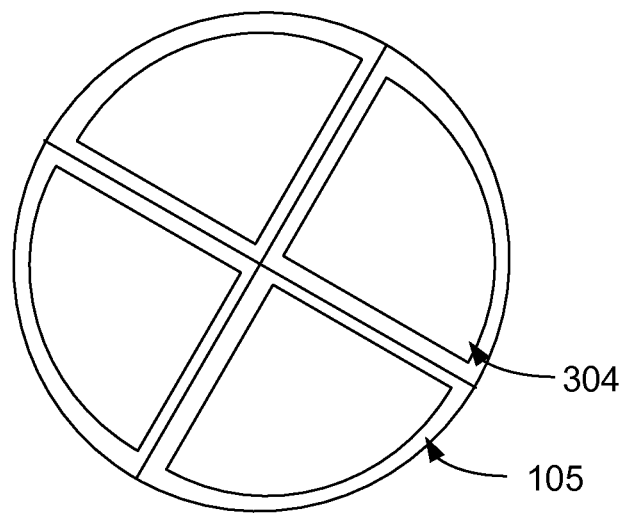
FIG. 3B illustrates a bottom view of the example plate support structure as described with reference to FIG. 3A, in accordance with an embodiment of the present invention.

FIG. 3B illustrates a bottom view of the example plate support structure as described with reference to FIG. 3A, in accordance with an embodiment of the present invention.

Compartments as described with reference to FIG. 3A have been removed leaving plate support structure 105 with and empty cut-out 304.

FIG. 3B illustrates a bottom view of the example plate support structure as described with reference to FIG. 3A with the compartments removed.

Figure 4:
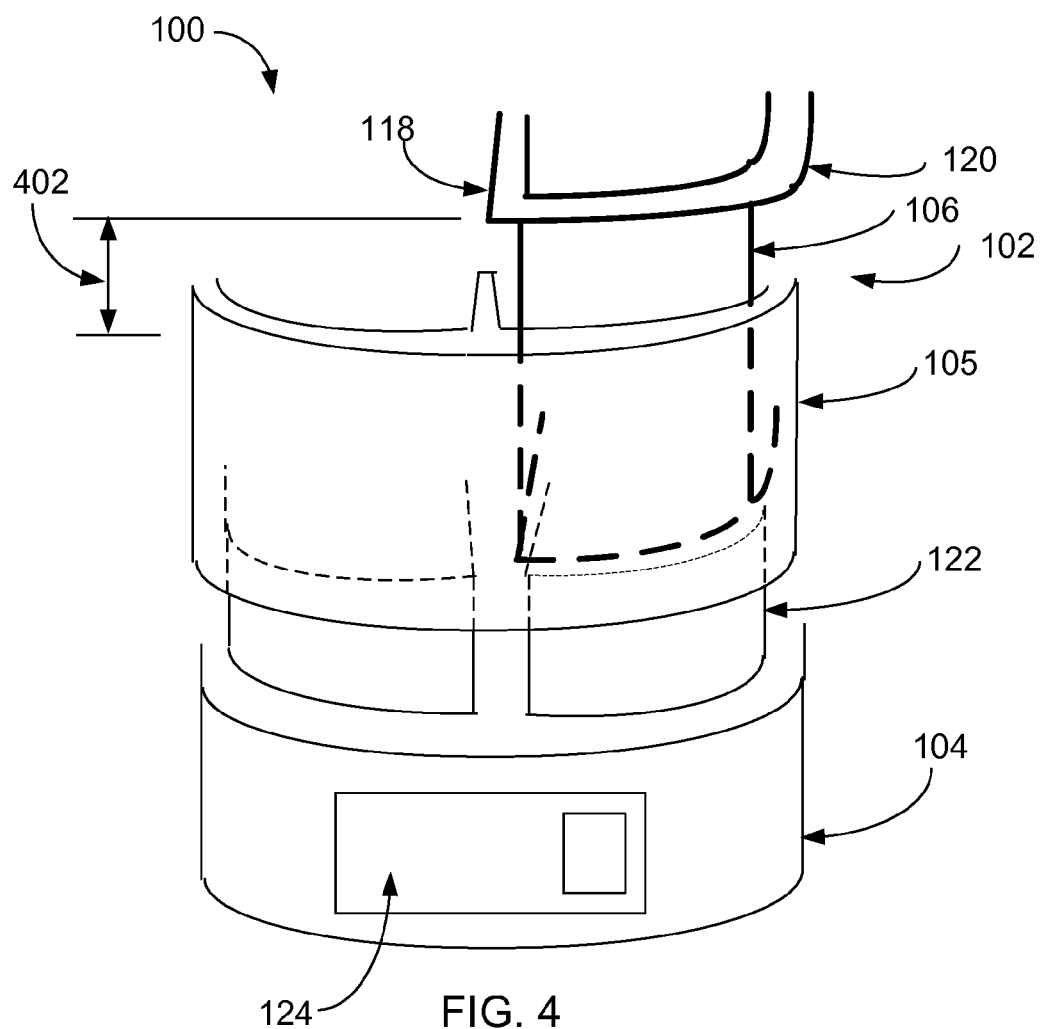
FIG. 4 illustrates a partial view of the example scale system as described with reference to FIG. 1, in accordance with an embodiment of the present invention.

FIG. 4 illustrates a partial view of the example scale system as described with reference to FIG. 1, in accordance with an embodiment of the present invention.

Compartment portion 106 has been pushed up by pedestal portion 122 causing lip 118 and lip 120 to be a distance 402 above upper portion of plate support structure 105.

The weight of compartment portion 106 is measured via pedestal portion 122 and processed by scale portion 104. Furthermore, the weight of items contained within compartment portion 106 is presented for viewing via presentation portion 124. Furthermore, other information, such as caloric and nutritional content, are presented for viewing via presentation portion 124.

As an example, a person places a food item into the compartment and is presented the weight of the food item contained within the compartment.

FIG. 4 illustrates a partial view of the example scale system as described with reference to FIG. 1 where a compartment is pushed up via a pedestal of a scale and the weight of an item located within the compartment is presented for viewing.

Figure 5:
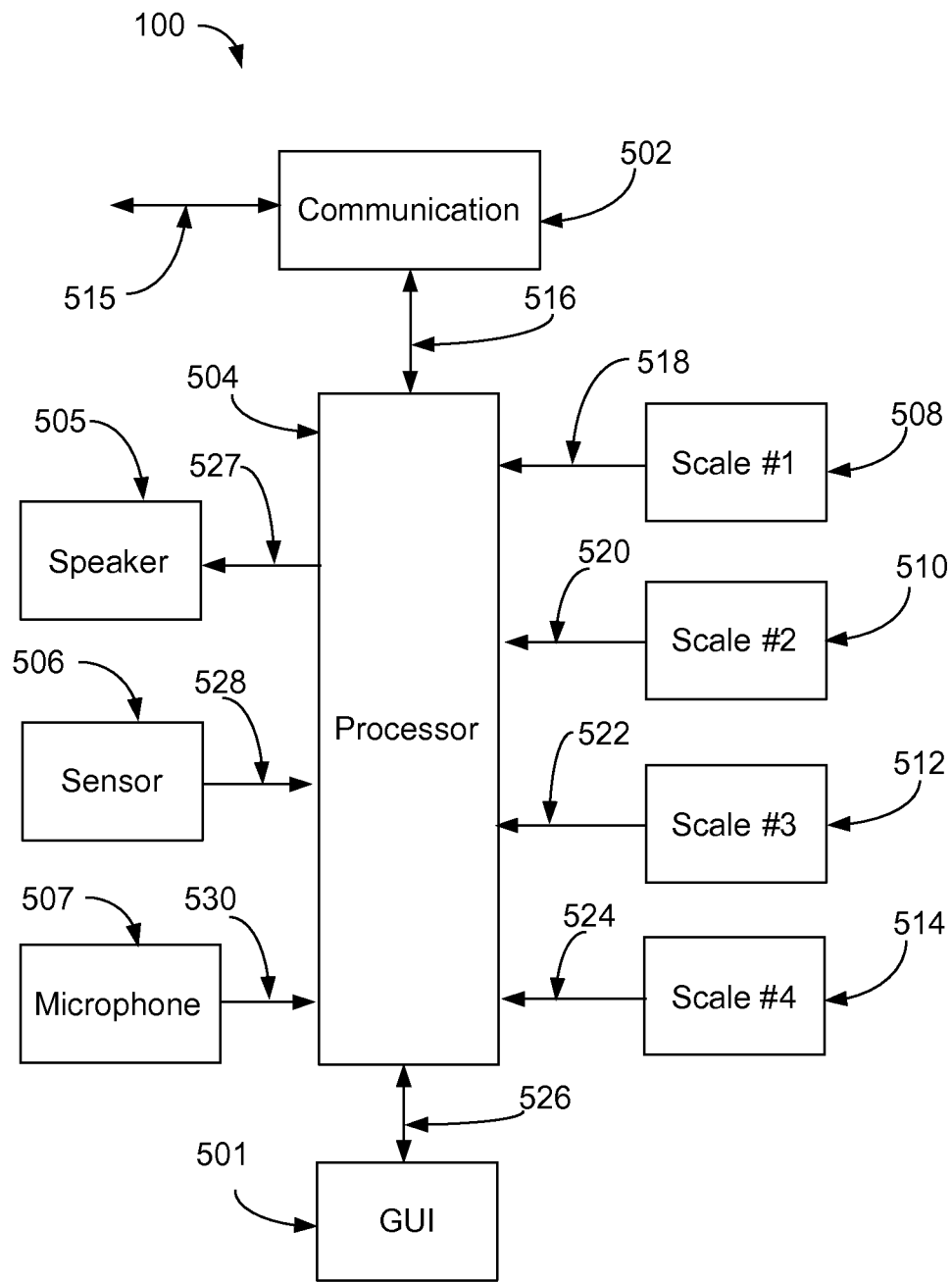
FIG. 5 illustrates a block diagram of the example scale system as described with reference to FIG. 1, in accordance with an embodiment of the present invention.

FIG. 5 illustrates a block diagram of the example scale system as described with reference to FIG. 1, in accordance with an embodiment of the present invention.

Scale system 100 includes a GUI portion 501, a communication portion 502, a processor portion 504, a speaker portion 505, a sensor portion 506, a microphone portion 507, a scale portion 508, a scale portion 510, a scale portion 512 and a scale portion 514.

Communication portion 502 communicates bi-directionally with external entities via a communication channel 515. Processor portion 504 communicates bi-directionally with communication portion 502 via a communication channel 516. Processor portion 504 receives information from scale portion 508 via a communication channel 518. Processor portion 504 receives information from scale portion 510 via a communication channel 520. Processor portion 504 receives information from scale portion 512 via a communication channel 522. Processor portion 504 receives information from scale portion 514 via a communication channel 524. Processor portion 504 communicates bi-directionally with GUI portion 501 via a communication channel 526. Speaker portion 505 receives information from processor portion 504 via a communication channel 527. Processor portion 504 receives information from sensor portion 506 via a communication channel 528. Processor portion 504 receives information from microphone portion 507 via a communication channel 530.

GUI portion 501 provides capability for presenting information for viewing and for receiving information from a user. Furthermore, GUI portion 501 may be configured as physically separate from the plate assembly for some embodiments. For physically separated GUI portion 501 from the plate assembly, GUI portion 501 may communicate with components of scale support structure 121 (FIG. 1) via any known means of communication. Non-limiting examples for means for communicating between components of scale support structure 121 and GUI portion 501 include wireless, infrared and Universal Serial Bus (USB).

Communication portion 502 enables communication with external entities. Non-limiting examples for means for communication include wireless, wired and infrared.

Processor portion 504 executed operational codes for controlling the operation of scale system 100.

Speaker portion 505 provides capability for presenting audio information.

Sensor portion 506 provides detection and recognition for the type of plate residing on scale system 100 as described with reference to FIG. 1 and FIG. 4.

Microphone portion 507 provides capability for receiving audio information.

Scale portion 508, scale portion 510, scale portion 512 and scale portion 514 determine the weight of associated item or items.

In operation, processor portion 504 communicates bi-directionally with external entities via communication portion 502. Non-limiting examples of information communicated include configuration, software, software updates, control information and status information. Processor portion 504 receives information from sensor portion 506, microphone portion 507, scale portion 508, scale portion 510, scale portion 512 and scale portion 514. As a non-limiting example, weight information may be received by processor portion 504 from scale portions 508, 510, 512 and 514. As a non-limiting example, type of plate information may be received from sensor portion 506. As a non-limiting example, processor portion 504 may receive and process information from microphone portion 507 in order to configure operation of scale system 100. Processor portion 504 performs processing of received information in order to determine the weight of objects located within a plate situated on scale portions 508, 510, 512 and 514. Processor presents processed information for viewing via GUI portion 501.

FIG. 5 illustrates a block diagram of the example scale system as described with reference to FIG. 1 where information is received from scales for determining the weight of items located within a plate.

Figure 6:
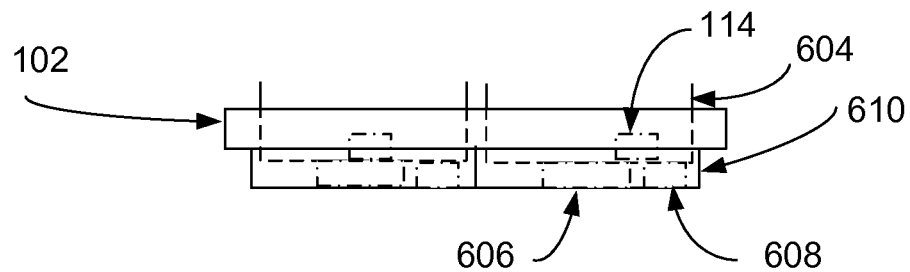
FIG. 6 illustrates a side view of an example plate as described with reference to FIG. 1, in accordance with an embodiment of the present invention.

FIG. 6 illustrates a side view of an example plate as described with reference to FIG. 1, in accordance with an embodiment of the present invention.

Plate portion 102 includes a multiplicity of compartments with a sampling noted as a compartment portion 604, a scale portion 606 and a communication portion 608.

Scale portion 606 and communication portion 608 are enclosed within a support structure 610.

Compartment portion 604 provides containment of items.

Scale portion 606 provides capability to weigh contents contained within compartment portion 604.

Communication portion 608 provides capability to communication information to an external entity. Non-limiting examples for communication portion 608 include wireless and infrared.

Communication portion 608 receives weight information associated with item 114 and communicates information to external entities.

In operation, item 114, located in compartment portion 604 is weighed by scale portion 606. Scale portion 606 communicates weight of item 114 to communication portion 608. Communication portion 608 communicates weight information to external entity.

FIG. 6 illustrates a side view of an example plate as described with reference to FIG. 1 where a scale internal to plate weighs item contained within plate and communicates weight information to a communication portion for transmission to an external entity.

Figure 7:
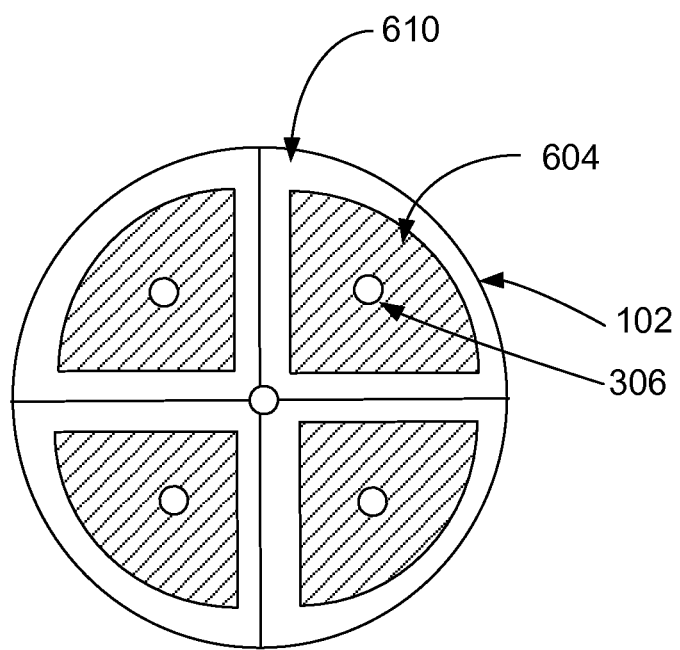
FIG. 7 illustrates a bottom view of the example plate as described with reference to FIG. 6, in accordance with an embodiment of the present invention.

FIG. 7 illustrates a bottom view of the example plate as described with reference to FIG. 6, in accordance with an embodiment of the present invention.

Identifier tag 306 is configured on the bottom of compartment portion 604 for identifying the type of plate associated with plate portion 102.

FIG. 7 illustrates a bottom view of the example plate as described with reference to FIG. 6 where an identification tag identifies the type of plate.

Figure 8:
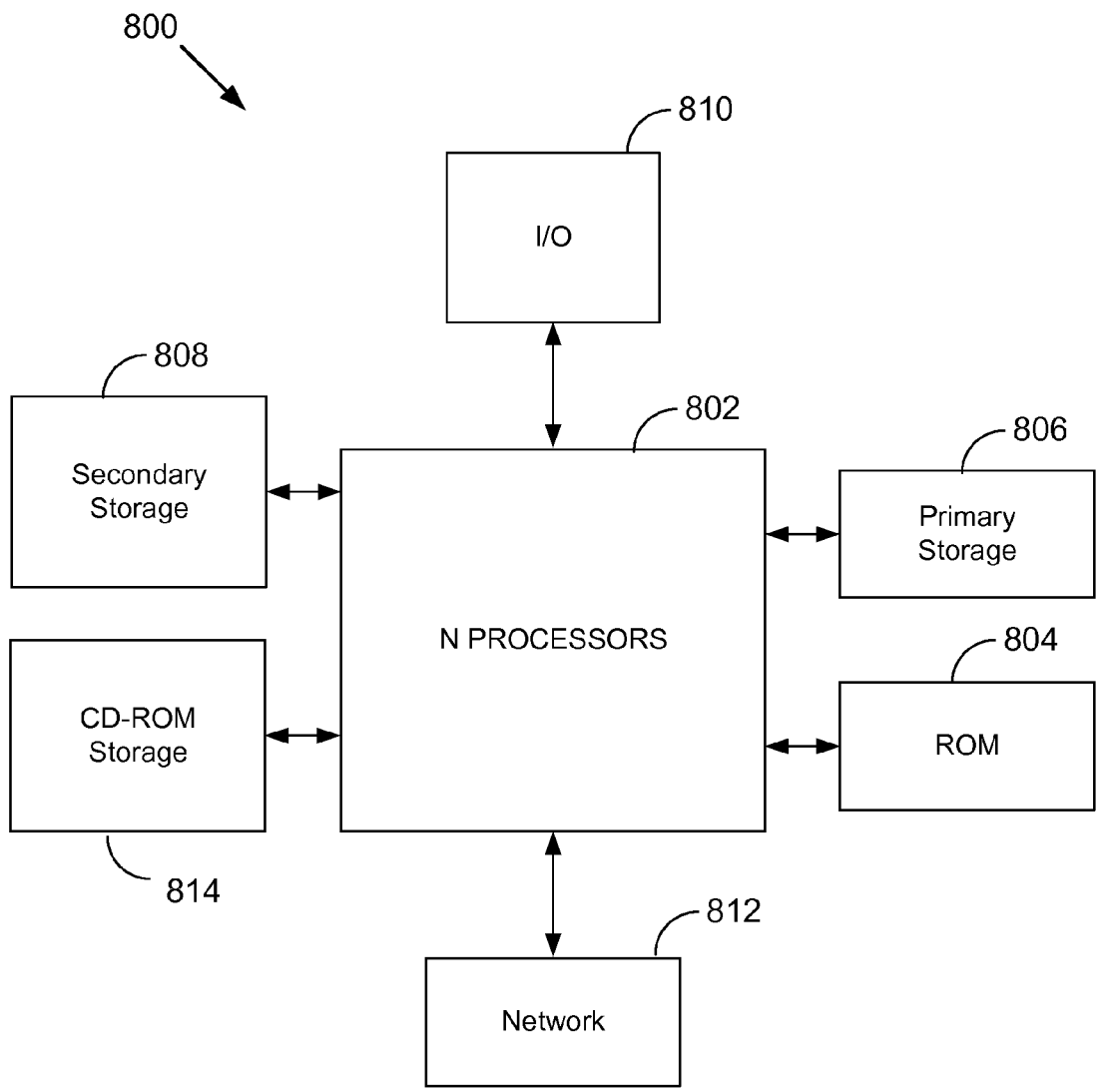
FIG. 8 illustrates a typical computer system that, when appropriately configured or designed, may serve as a computer system for which the present invention may be embodied.

FIG. 8 illustrates a typical computer system that, when appropriately configured or designed, may serve as a computer system 800 for which the present invention may be embodied.

Computer system 800 includes a quantity of processors 802 (also referred to as central processing units, or CPUs) that may be coupled to storage devices including a primary storage 806 (typically a random access memory, or RAM), a primary storage 804 (typically a read-only memory, or ROM). CPU 802 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 804 acts to transfer data and instructions uni-directionally to the CPU and primary storage 806 typically may be used to transfer data and instructions in a bi-directional manner. The primary storage devices discussed previously may include any suitable computer-readable media such as those described above. A mass storage device 808 may also be coupled bi-directionally to CPU 802 and provides additional data storage capacity and may include any of the computer-readable media described above. Mass storage device 808 may be used to store programs, data and the like and typically may be used as a secondary storage medium such as a hard disk. It will be appreciated that the information retained within mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 may also be coupled to an interface 810 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to an external device such as a database or a computer or telecommunications or internet network using an external connection shown generally as a network 812, which may be implemented as a hardwired or wireless communications link using suitable conventional technologies. With such a connection, the CPU might receive information from the network, or might output information to the network in the course of performing the method steps described in the teachings of the present invention.

Figure 9:
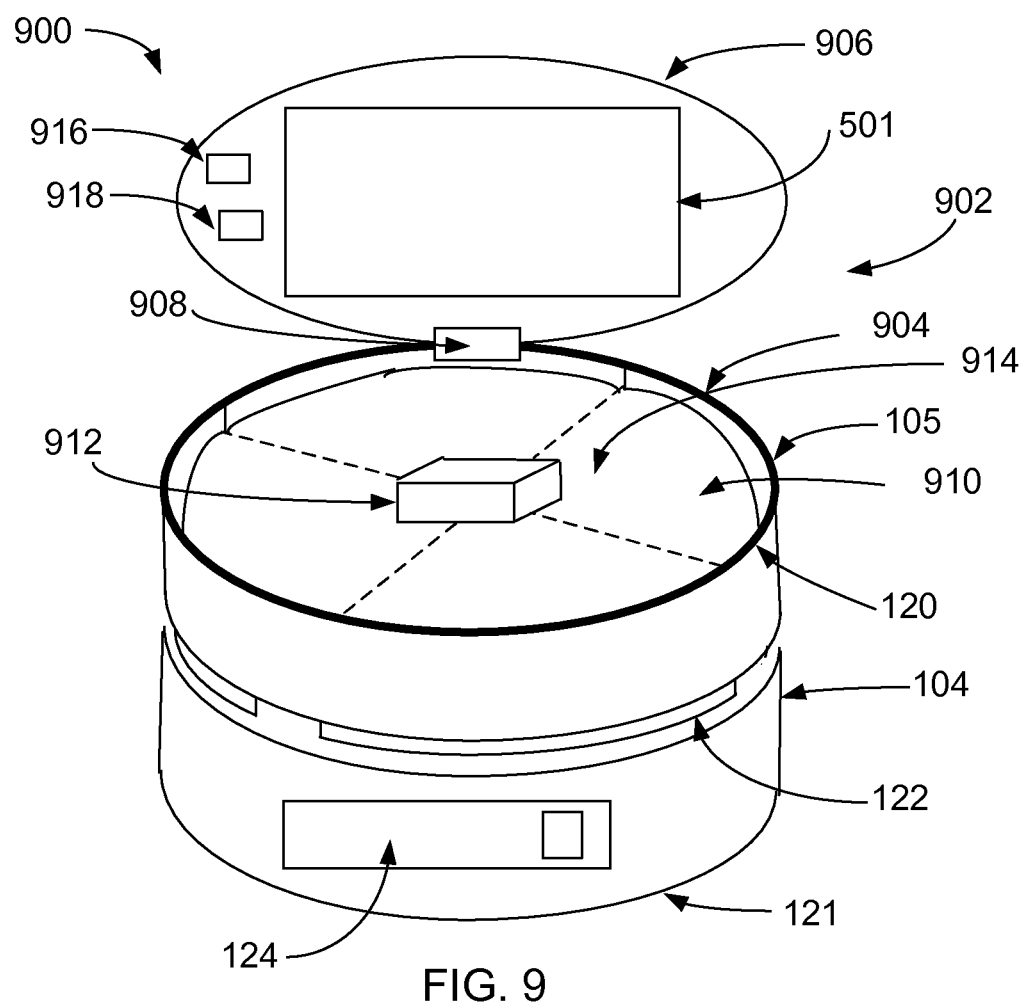
FIG. 9 illustrates an example scale system, in accordance with an embodiment of the present invention.

FIG. 9 illustrates an example scale system, in accordance with an embodiment of the present invention.

A scale system 900 includes a plate assembly 902 and scale portion 104 (FIG. 1).

Plate assembly 902 enables containment and processing associated with food items placed within plate assembly 902.

Plate assembly 902 includes a plate portion 904 and a lid portion 906. Plate portion 904 and lid portion 906 are connected via a hinge 908.

Plate portion 904 provides a cavity 910 for placement of food items with a sampling noted as a food item 912. As a non-limiting example, plate portion 904 may be rigid, semi-rigid or flexible.

Plate portion 904 provides a multiplicity of sections with a sampling noted as a section 914. Section 914 provides capability to weigh an item located on section 914. As a non-limiting example, section 914 may weigh the amount of food item 912 located above section 914.

Lid portion 906 includes GUI portion 501, a communication port 916 and an antenna 918. In some embodiments communication port 916 and antenna 918 are not included.

Communication port 916 provides communication with external devices. As a non-limiting example, communication port 916 may be configured as USB.

Antenna 918 provides capability for wireless communication with external wireless devices.

Scale system 900 operates in a similar manner scale system 100 as described with reference to FIG. 1.

FIG. 9 illustrates an example scale system where a plate provides storage and processing associated with food items and a GUI for receiving and presenting information.

Some alternative embodiments of the present invention may exclusively use a remote or mobile display screen that is configured to be in (direct or indirect) communication with the smart scale system (e.g., without limitation, a tablet or smart phone display screen).

Some alternative embodiments of the present invention may also be configured with the capability to use convention speech technologies to enable (one way or two way) verbal communication with the user to control and/or access desired functions or information.

Some alternative embodiments of the present invention may also be configured with a body composer capability, which employs convention body simulation and visualization technologies to enable the smart scale system to produce a visual simulation of what the user's body may look like at some future time based on a certain set of calorie intake and consumption assumptions while working toward the dieting goals. This could be a useful motivation tool for many users. By way of example, and not limitation, in one implementation approach if the user's goal is to lose 60 lbs in, say, 12 months the smart scale body composer would show the user what he/she would look like at the end of the 12 months. In some embodiments of this body composer it may optionally also display a progression during the simulation period; e.g., without limitation, for a 12 month and 60 lbs target, it might show the user estimates what 10 lbs, 20 lbs, 30 lbs, etc loss may look like, at various increments (e.g., without limitation, as low as 5 lbs increments). Some exemplary implementation approaches include, but are not limited to, the follow 2 ways: 1 the user would program his/her body measurements in the body composer program and the computer will make a body composite of the user, possibly using stock art of a (e.g., demographically) similar person; or 2nd, the user can take a picture of his/herself (possibly right from the smart scale system if an optional camera is built in). The body composer program would use the inputted measurements, and optional demographic info, and the picture, if provided, to show the user an estimate of what the target weight loss may look like. In some embodiment, the user may also use this in reverse; that is, for people who want to gain weight (e.g., bodybuilders, and fitness models) the body composer may also be configured to show muscle growth; by way of example, and not limitation, it would simulate the user's appearance after a 20 lbs muscle weight gain. Examples of people that may benefit from the body composer feature includes athletes, actors, models, elderly people who want to look younger and fit, or anyone who wants to change there body and see what they can look like by following there goals. It is contemplated that those skilled in the art, in light of the present teachings, will readily recognize how to adapt conventional body simulation technologies (e.g., those used by law enforcement artist to simulate aging or weight gain/loss) to achieve the foregoing capabilities, as needed for the particular application, without undue experimentation.

In some embodiments of the present invention, the smart plate system may be programmed with a large database of pertinent data and information helpful to the foregoing goals and features; e.g., without limitation food nutritional values, articles about dieting, and meals, nutrition, workout regiments etc. In some alternative embodiment, this information database is used to set a dieting plan and guidance based on inputted (verbal and/or textual) goals and requirements; operating sort of like an electronic personal trainer and wellness information center to help track the user's goals and help achieve them.

All the features disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods for a scale system according to the present invention will be apparent to those skilled in the art. The invention has been described above by way of illustration, and the specific embodiments disclosed are not intended to limit the invention to the particular forms disclosed. For example, the particular implementation of the scale may vary depending upon the particular type of plate used. The plates described in the foregoing were directed to implementations with movable compartments; however, similar techniques using stationary implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An apparatus comprising:
   a plate device comprising a support structure and a plurality of compartments being configured to retain items, said compartments being supported by said support structure;
   a plurality of weighing devices as part of a scale structure each being configured to weigh a one of said compartments;
   a scale support structure being configured to support said plate device and said weighing devices wherein said support structure comprises a plurality of pedestal portions each being configured to lift a compartment from said support structure;
   a processing device being in communication with said weighing devices and being operable to at least process weight information; and a presentation device being in communication with said processing device, said presentation device being operable to enable a user to identify types of food in said compartments, said presentation device further being operable to at least display processed weight information of items in each of said compartments and to display a sum total of processed weight information of items retained in said plate device.

2. The apparatus as recited in claim 1, in which each of said compartments is independently movable within said support structure.

3. The apparatus as recited in claim 1, in which each of said compartments further comprises an identifier tag.

4. The apparatus as recited in claim 3, further comprising a plurality of sensor devices each being operable to detect an identifier tag and communicate the detection to said processing device.

5. The apparatus as recited in claim 4, further comprising a user interface in communication with said processing device in which the user at least identifies a type of items associated with an identifier tag.

6. The apparatus as recited in claim 1, further comprising a communication port in communication with said processing device, said communication port being configured to at least enable communication with external computing devices.

7. The apparatus as recited in claim 1, further comprising a lid being movably joined to said plate device.

8. The apparatus as recited in claim 7, in which said lid is configured to retain at least said presentation device.

9. The apparatus as recited in claim 1, in which the items are food items and said processing device is further operable to at least process the weights to provide nutritional information for display.

10. A system comprising:
a plate device comprising a support structure and at least four compartments being configured to retain food items, said compartments being supported by said support structure;
at least four weighing devices each being configured to weigh a one of said compartments, wherein the weighing devices are part of a scale structure;
a scale support structure being configured to support said plate device and said weighing devices, wherein said scale support structure further comprises at least four pedestal portions each being configured to lift a compartment from said support structure;
a processing unit being in communication with said weighing devices and being operable to at least process weight information to at least determine weight and nutritional information for the food items; and
a graphic user interface being in communication with said processing unit, said graphic user interface being operable to at least enable a user to identify types of food in said compartments, said graphic user interface being further operable to at least display weight and nutritional information of food items in each of said compartments and to display a sum total of weight and nutritional information of food items retained in said plate device.

11. The system as recited in claim 10, in which each of said compartments is independently movable within said support structure.

12. The system as recited in claim 10, in which each of said compartments further comprises an identifier tag.

13. The system as recited in claim 12, further comprising a plurality of sensor devices each being operable to detect an identifier tag and communicate the detection to said processing unit.

14. The system as recited in claim 13, further comprising a microphone in communication with said processing unit being configured to at least enable the user to use voice input to at least identify types of food items associated with identifier tags.

15. The system as recited in claim 10, further comprising a communication port in communication with said processing unit, said communication port being configured to at least enable communication with external computing devices.

16. The system as recited in claim 10, further comprising a lid being movably joined to said plate device.

17. The system as recited in claim 16, in which said lid is configured to retain at least said graphic user interface.

18. A system comprising:
a plate device comprising a support structure and at least four compartments being configured to retain food items, said compartments being supported by said support structure and being independently movable in a vertical direction with respect to said support structure, each of said compartments further comprising an identifier tag;
at least four sensor devices each being operable to detect an identifier tag;
at least four weighing device as part of a scale structure each being configured to weigh a one of said compartments;
a scale support structure being configured to support said plate device and said weighing devices, said scale support comprising at least four pedestal portions each being configured to lift a compartment from said support structure;
a processing unit being in communication with said weighing devices and said sensor devices, said processing unit being operable to at least process weight information and sensor device inputs to at least determine weight and nutritional information for the food items;
a microphone in communication with said processing unit being configured to at least enable the user to use voice input to at least identify types of food items associated with identifier tags;
a speaker in communication with said processing unit configured to at least provide audible weight and nutritional information for the food items;
a communication port in communication with said processing unit, said communication port being configured to at least enable communication of at least weight and nutritional information for the food items to external computing devices;
a graphic user interface being in communication with said processing device, said graphic user interface being operable to at least enable a user to identify types of food in said compartments, said graphic user interface being further operable to at least display weight and nutritional information of food items in each of said compartments and to display a sum total of weight and nutritional information of food items retained in said plate device; and
a lid being movably joined to said plate device, said lid being configured to retain at least said graphic user interface.

* * * * *